United States Patent [19]
Hasstedt

[11] 3,794,296
[45] Feb. 26, 1974

[54] CRANE AND TOW UNIT
[76] Inventor: Roger D. Hasstedt, 4041 Hubbell Ave., Des Moines, Iowa 50317
[22] Filed: Aug. 10, 1971
[21] Appl. No.: 170,545

[52] U.S. Cl............. 254/8 B, 214/86 A, 254/139.1, 212/66
[51] Int. Cl.............................................. B60p 3/12
[58] Field of Search............................... 214/86 A; 212/66–68, 145; 254/139.1, 8 B, 8 C

[56] References Cited
UNITED STATES PATENTS

| | | | |
|---|---|---|---|
| 527,741 | 10/1894 | Bennett | 214/145 |
| 2,662,212 | 1/1954 | Flanders | 254/139.1 X |
| 2,818,984 | 1/1958 | Nims | 214/86 A |
| 3,035,713 | 5/1962 | Iserman | 212/145 |
| 3,145,857 | 8/1964 | Hayman et al. | 214/86 A |
| 3,263,822 | 8/1966 | Weinman | 212/145 |
| 3,275,296 | 9/1966 | Meyer | 254/139.1 X |
| 3,335,880 | 8/1967 | Ortiz | 214/86 A |
| 3,599,812 | 8/1971 | Hasstedt | 214/86 A |

Primary Examiner—Albert J. Makay
Attorney, Agent, or Firm—Zarley, McKee & Thomte

[57] ABSTRACT

A portable trailerable vehicle capable of lifting and towing disabled vehicles and when stationary functioning as a crane to move movable objects to desired locations about the rotational axis of the upright standard. The upright standards and the tongue members are pivotally relative to each other to extend in the same direction or opposite directions. When the unit is collapsed a boom extends upwardly from the standard and a cable extending rearwardly therefrom allows the unit to perform pulling operations as in the straightening of body parts of vehicles. The height of the pulling action is variable with the ground support wheels used. A jack arm may be pivotally connected to the cross frame with a cable connected to the upright standard for use of the unit as a jack. Desired platform structures may be mounted on the outer end of the jack arm. For long lifting distances a winch cable may supplement the crane lifting cable. The transport wheels may be moved between raised and lowered positions through 180° pivotal action with the second set of wheels being stationary on the bottom side of the cross frame or on the wheel mounting arm opposite the first set of wheels. Also, the second set of wheels may be pivotal with the tongue members to move between downwardly and upwardly extending positions. The upper end of the upright standard may alternatively include a light unit to be seen over a disabled vehicle being towed or an extension tongue unit for moving the unit when the upright standard is horizontally disposed. A stabilizer arm extends outwardly from the tongue members and includes a jack having vertically spaced apart mounting brackets for use depending on which set of wheels are in ground engagement. The vertical standard is rotatable between positions substantially perpendicular to the cross frame while adjustable stops permit 360° rotation.

6 Claims, 25 Drawing Figures

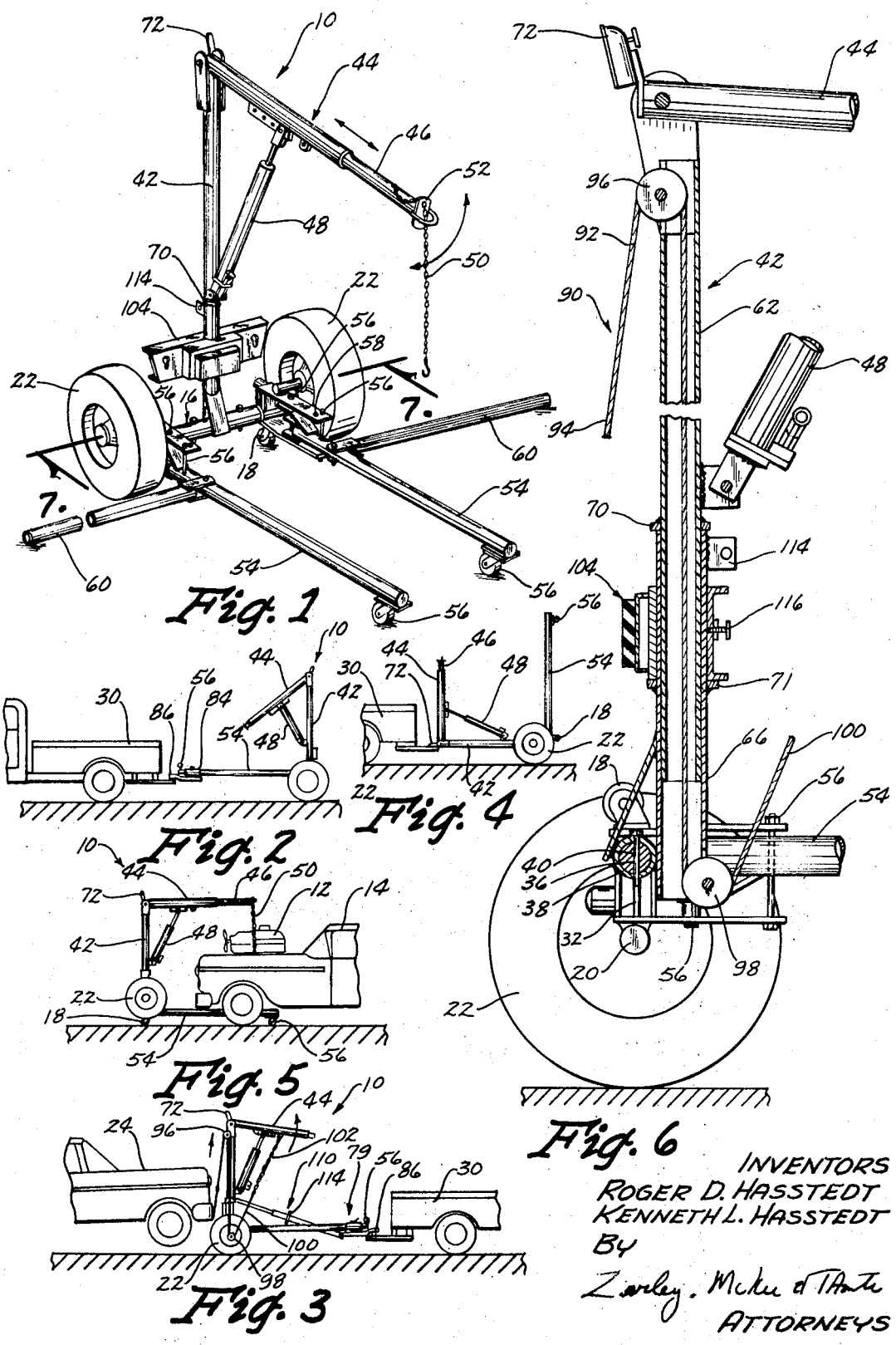

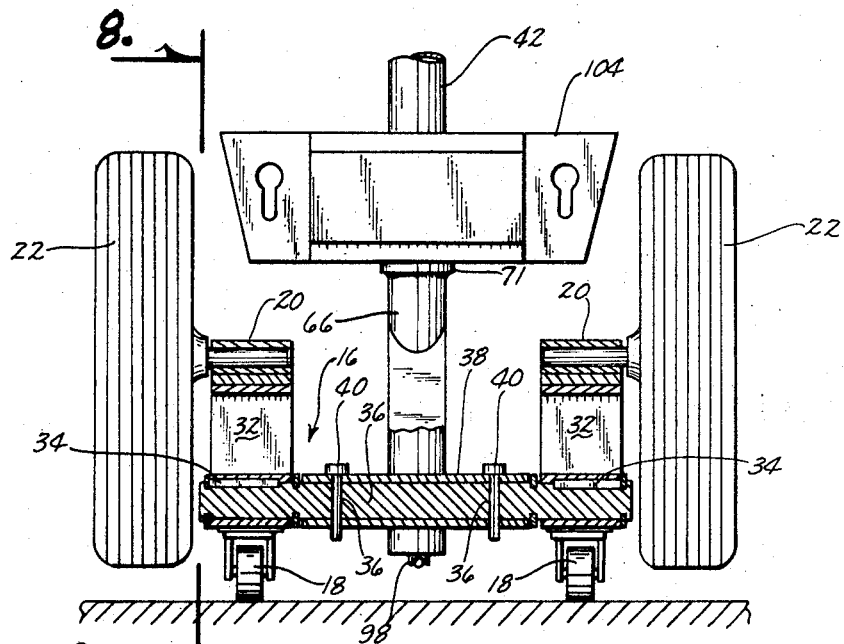
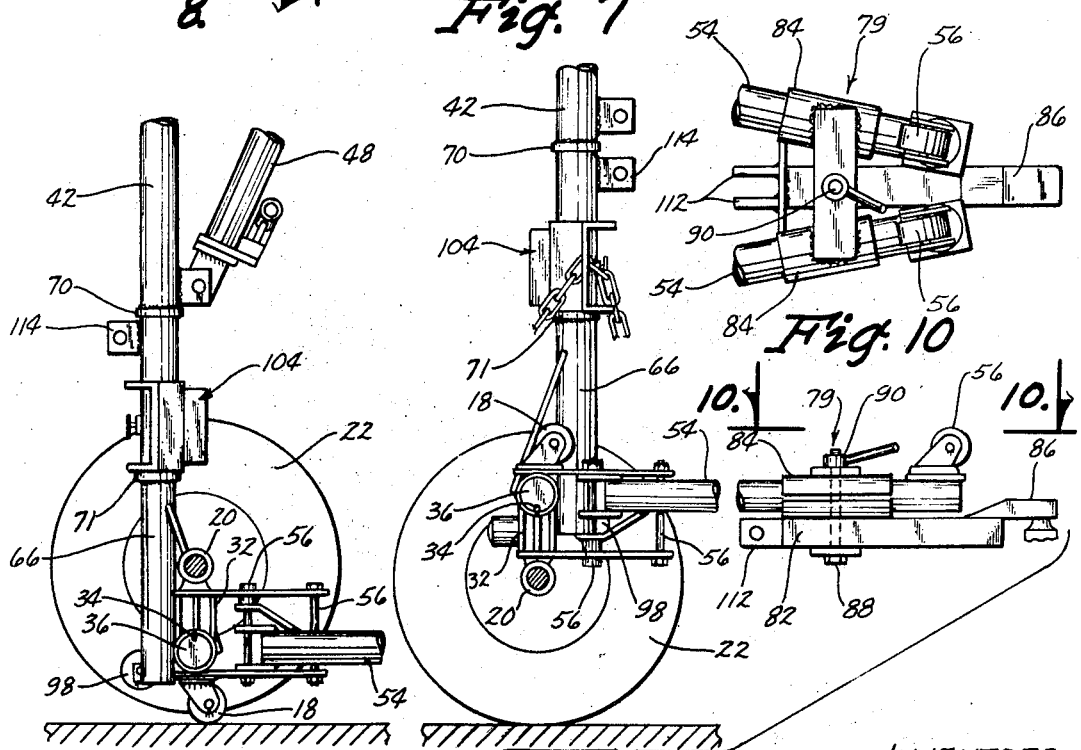
Fig. 7  Fig. 10  Fig. 8  Fig. 9
INVENTORS
ROGER D. HASSTEDT
KENNETH L. HASSTEDT
BY
Zarley, Mckee & Thomte
ATTORNEYS

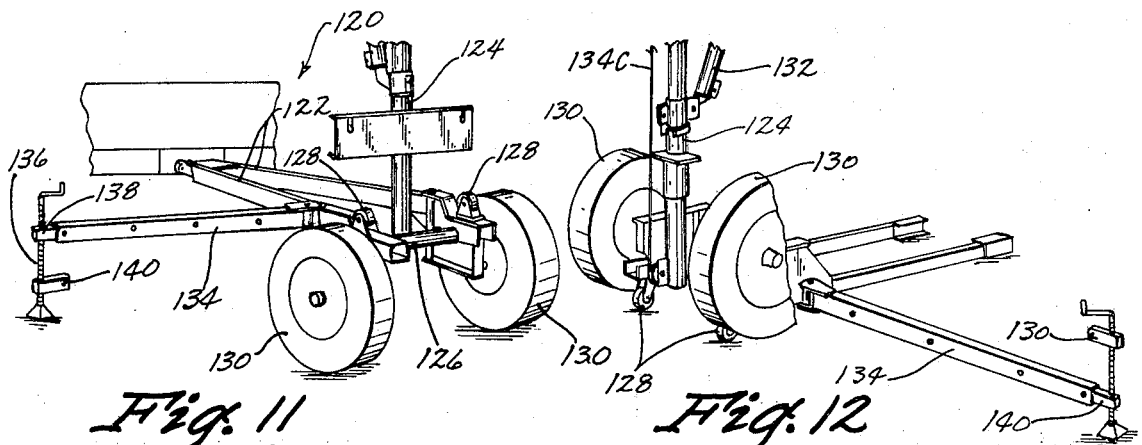
Fig. 11  Fig. 12
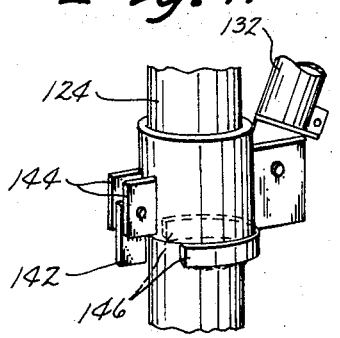 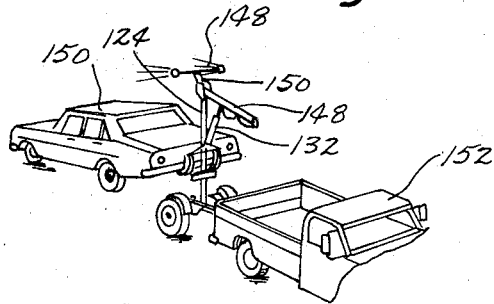
Fig. 13  Fig. 14
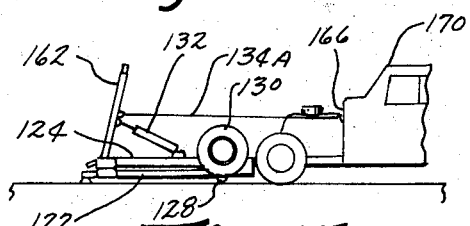 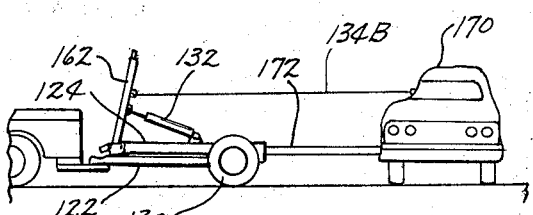
Fig. 15  Fig. 16
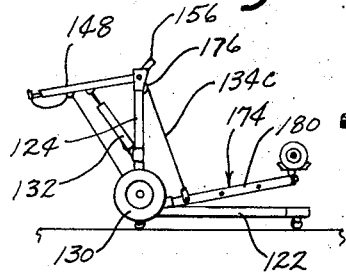 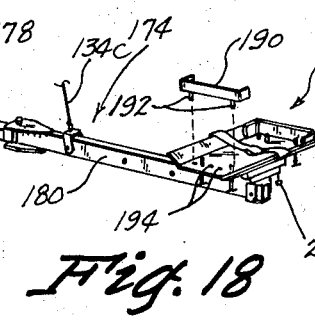 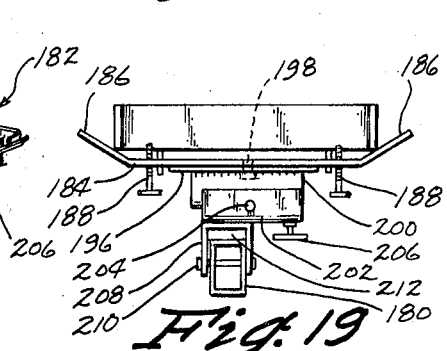
Fig. 17  Fig. 18  Fig. 19
INVENTOR
ROGER D. HASSTEDT
BY
Zarley, McKee & Thomte
ATTORNEYS

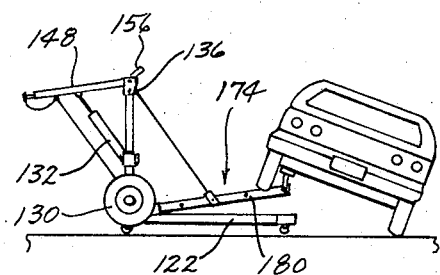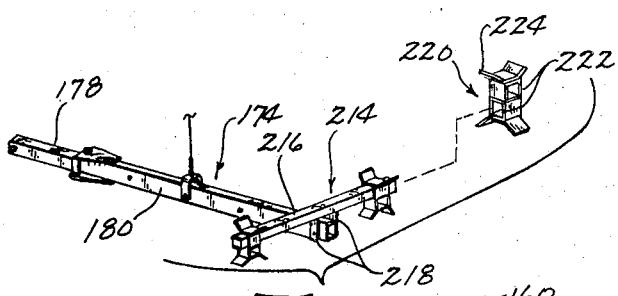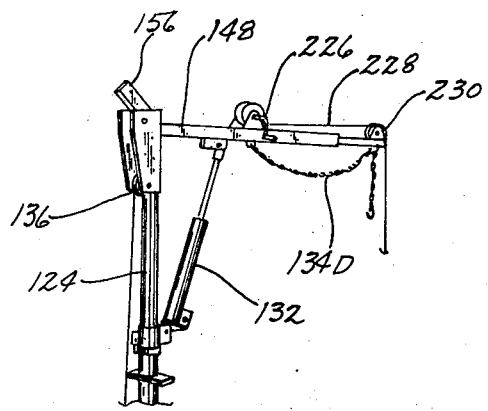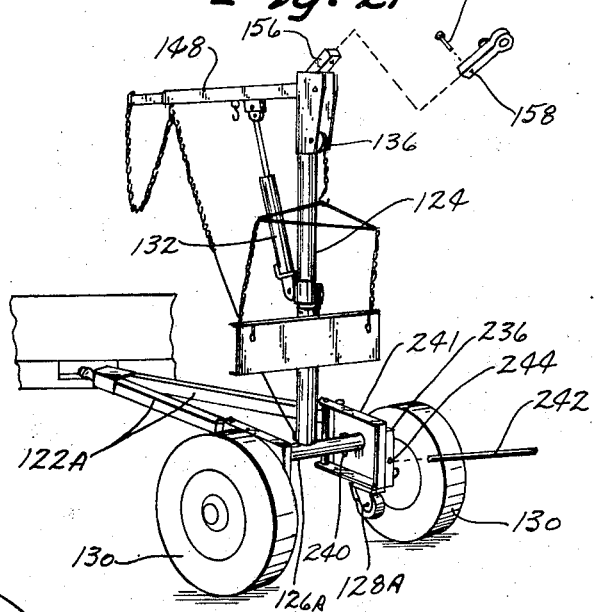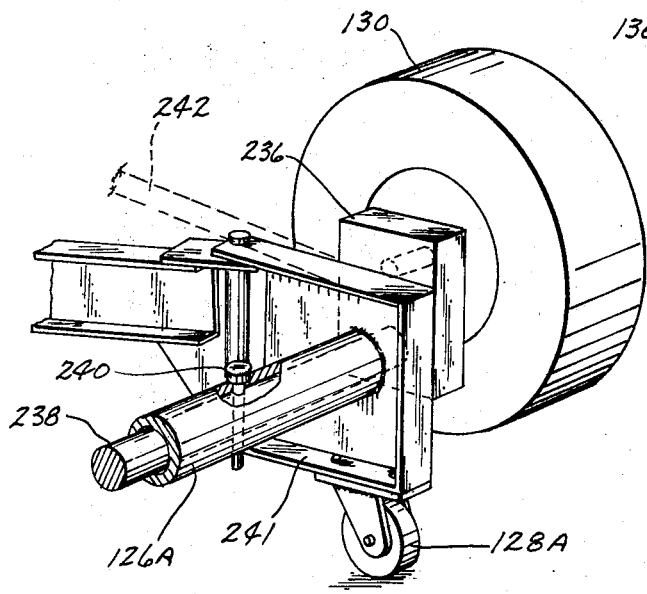

CRANE AND TOW UNIT

Vehicle service stations are commonly called upon to remove engines from automobiles which requires the use of a crane type device and also have a significant demand for towing disabled vehicles. There is no unit presently available which will perform both of these functions. A car wrecker type vehicle is available but is extremely expensive and thus impractical for most operators to own.

The crane and tow unit of this invention is capable of being used both as a crane and as a wrecker since it is capable of towing disabled vehicles. The simplicity of the unit makes it easily operated as a crane or towing unit and also minimizes the cost for the unit.

When the unit is being used as a crane it is desirable that it be carried on swivel or caster type wheels such that it can be moved forwardly or sideways with ease. When the unit is being moved to another location transport wheels are desirable and when the unit s being used as a tow unit the transport wheels are used.

The conversion of the unit from a crane to a tow unit is made possible by there being a transverse frame on which two sets of wheels are provided on opposite sides thereof. A pair of arms extend perpendicularly outwardly therefrom and serve as a stabilizer arms when the unit is being used as a crane and also serve to turn the frame 90° or 180° to bring the transport wheels into ground engagement. If the unit is being towed as a crane a hitch at the upper end of the crane standard is connected to a towing vehicle by pivoting the unit 90°, however, if the unit is to be used as a towing vehicle the stabilizing members are pivoted 180° and a hitch assembly is connected thereto for connection to a towing vehicle. The standard on which the boom is carried will remain vertical at all times except during storage.

The boom is versatile in that it will pivot up and down and is extendable while rotating about the longitudinal vertical axis of the standard.

A pair of outwardly extending outrigger arms are also provided to give additional stability to the unit such that an engine carried on the boom may be lifted out of an automobile and pivoted away from the automobile where it can be worked out.

When the unit is in the towing position a cable arrangement is used which allows one end of the cable to be connected to the vehicle being towed and then the cable extends over a pulley at the top of the standard, down through the standard over a pulley at the bottom thereof and back up to an attachment with the boom such that as the boom is raised by a hydraulic jack the disabled vehicle will also be raised whereby it can be locked into engagement against the standard and the load on the cable may be released.

The standard may be pivoted forwardly or rearwardly to shift the weight on the support wheels and accordingly vary the weight on the towing vehicle as desired.

The addition of a vertical pivotal jack arm between the tongue members connected to the cross frame allows the outer end of the jack arm to function as a lifting jack for transmissions under vehicles or the like. The lifting cable is connected to the jack arm and extends to the top of the standard thence to the bottom thereof and back up to the outer end of the boom such that when the boom is raised the jack arm will also be raised. A joint in the jack arm permits lateral pivotal movement in addition to the vertical action. A platform on the outer end of the jack arm is pivotal from side to side with adjustable means to hold the platform at any desired angle. The platform is additionally rotatable and pivotal forwardly and backwardly. A plurality of upwardly extending leveling bolts are provided for assuring that the item being lifted is evenly supported. Detachable side walls are provided to hold the item in place on the platform.

The ability of the unit to collapse such that the standard is extending in the same direction as the tongue members allows it to be easily transported on the road and shipped as freight. Furthermore, it allows the boom to extend upwardly and the lifting cable to extend outwardly horizontally therefrom such that it can perform pulling functions such as straightening of vehicle body frames damaged in accidents. A spacing member may be provided between the cross frame and the vehicle being straightened. The level of the pulling action is determined by which set of wheels are supporting the unit. The smaller caster wheels will lower the height of the pulling cable while the larger transport wheels will raise it.

The upright standard is rotatable and is limited in its rotation by stops provided on opposite sides engageable with an adjustable dog member such that the boom will not accidently pivot to a position remote from its perpendicular relationship to the cross frame which would be dangerous and likely to tip the unit over when a load is being carried on the boom. The dog element permits full 360° rotation when desired.

The upper end of the standard is adapted to receive a light unit which will be positioned over a disabled vehicle being towed or alternatively when the standard is lowered to its horizontal position, a tongue unit may be connected thereto.

The outrigger stabilizer arms include jack units which have mounting brackets vertically spaced apart to accommodate the unit when either of the ground support wheels are being used which varies the height of the tongue members to which the stabilizer arms are connected.

When the unit is functioning as a crane it is often desirable to raise the lower loads substantial distances such as down into wells or the like and since the normal lifting action is limited to the pivotal movement of the boom relative to the standard it is desirable at times to secure a winch on the boom with a winch cable closely adjacent to the lifting cable such that loads may be lifted substantial distances.

An alternate embodiment involves making the tongue members rigid with the upright standard which may be more desirable in heavy duty type units. On this unit the transport wheels are carried on mounting arms pivotal between raised and lowered positions 180° apart. The second set of caster wheels may be mounted alternatively on the bottom of the cross frame or on the mounting arm opposite the transport wheels.

Thus it is seen that a single unit will perform readily and simply a plurality of important operations and will involve a minimum of cost while providing the maximum of dependability.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a perspective view of the unit being used as a crane for lifting engines from vehicles or the like.

FIG. 2 is a reduced in scale side elevation view of the unit in the towing position and being pulled behind a pickup truck.

FIG. 3 is a vieww similar to FIG. 2 but showing the unit beginning to lift a disabled vehicle into a towing position on the unit.

FIG. 4 is a side elevation view showing the unit in its crane position but being in a further alternate position for transport purposes.

FIG. 5 is a side elevation view showing the unit being used as a crane on the caster wheels lifting an engine out of a vehicle.

FIG. 6 is a cross sectional side elevation view with the unit in its raised towing position supported on the transport wheels.

FIG. 7 is a cross sectional view taken along lines 7 — 7 in FIG. 1 showing the cross frame rotated 180° and the swivel wheels supporting the unit being used as a crane.

FIG. 8 is a cross sectional side view taken along line 8 — 8 in FIG. 7.

FIG. 9 is a view similar to FIG. 8 but showing the cross frame rotated 180° as when the unit is used as a towing device.

FIG. 10 is a fragmentary top plan view of the hitch assembly of the towing unit taken along line 10 — 10 in FIG. 9.

FIGS. 11 and 12 are fragmentary perspective views illustrating the unit utilizing the transport wheels in FIG. 11 and the caster wheels of FIG. 12 with a jack at the outer end of a stabilizer arm and the jack includes separate mounting brackets for each of the two positions.

FIG. 13 is a fragmentary elevational view showing the stops to limit rotational movement of the upright standard.

FIG. 14 is a perspective view illustrating the signalling lights at the upper end of the standard extending over the disabled vehicle being pulled.

FIGS. 15 and 16 illustrate the unit in its collapsed position at two different elevations being used for pulling action in straightening the body of a vehicle.

FIGS. 17, 18 and 19 are views illustrating a jack arm and platform on the outer end thereof for lifting loads.

FIGS. 20 and 21 illustrate a bumper and frame attachment on the outer end of the jack arm.

FIG. 22 is a fragmentary perspective view illustrating a winch and winch cable on the room closely adjacent the lifting cable.

FIGS. 23, 24 and 25 illustrate an alternate embodiment of a rigid tongue and upright standard structure wherein the transport wheels are carried on mounting arms pivotal between raised and lowered positions 180° apart with a second set of wheels being either carried on the lower side of the cross frame or on the mounting arm opposite the transport wheels.

The crane and tow unit of this invention is referred to generally in FIG. 1 by the reference numeral 10 and is shown in the crane position for lifting engines or the like 12 from vehicles 14 as seen in FIG. 5.

The unit includes a cross frame 16 having a first pair of wheels in the nature of swivel or caster type wheels 18 at opposite ends of the frame as seen in FIG. 7. On opposite sides of the frame 16 are bearing sleeves 20 for a second pair of wheels 22 of the transport type which are used also for towing disabled vehicles 24 as seen in FIG. 3. It is thus seen that when the frame 16 is turned to the position of FIGS. 7 and 8 the caster wheels 18 are in engagement with the ground, however, when the unit is in the position of FIGS. 6 and 9 the transport wheels 22 engage the ground. Accordingly, it is seen that the cross frame 16 has been turned to 180° in moving between these respective positions. However, it should be noted that in FIG. 4 the crane unit has been pivoted 90° from its position in FIG. 1 to bring the wheels 22 into engagement with the ground for transporting the unit behind a pickup truck 30.

It is accordingly important that the spacing between the wheels 18 and 22 and the size thereof be sufficient that rotation of at least 90° will cause the larger wheels 22 to come into contact with the ground and move the caster wheels 18 out of ground engagement.

The bearing mountings 20 are carried on end members 32 which are locked by keys 34 to a center cross frame shaft 36 which extends through a sleeve 38 selectively adapted to be locked to the shaft 36 by removable pins 40.

It is seen that an upstanding standard 42 is rigidly connected to the sleeve 38 and includes a pivotal boom 44 which is provided with an extendable outer boom portion 46. The boom 44 is also pivotal on a vertical plane through operation of a hydraulic jack 48 interconnecting the boom 44 to the standard 42. A lifting chain 50 is selectively and detachably connected to the outer end of the boom section 44 through use of a connecting bracket 52.

The crane unit is stabilized through use of a pair of elongated leg members 54 extending perpendicular to the cross frame as seen in FIG. 1 and having caster wheels 56 at their outer ends. The angle of the stabilizer arms 54 may be selectively varied through positioning of connecting bolts 56 extending through the inner ends of the arm members 54 with the outer bolt being adapted to pass through one of several openings 58 to provide for the angular adjustment. Further stabilization of the unit is made possible by the outrigger arms 60 pivotally connected to the stabilizer arms 54 and thus when the engine 12 is removed from the vehicle 14 the boom 44 may be pivoted out of alignment with the stabilizer arms 54 towards one side or the other over one of the outrigger arms 60.

In FIG. 6 it is seen that the standard 42 includes an upper sleeve 62 received in a lower support sleeve 66. A sleeve or ring forming a shoulder 70 is welded to the upper sleeve 62 while a similar sleeve or ring forming a shoulder 71 is welded to the lower sleeve 66. A bumper block unit 104 hereinafter described is rotatably and vertically slidably mounted on the bottom support sleeve 66 and rides on the top side of the shoulder 71. Thus it is seen that the downward face on the standard 42 is transmitted from the upper sleeve 62 through the annular ring or sleeve shoulder 70 to the bottom sleeve 66. Weight carried on the bumper block 104 is transmitted through the shoulder 71 to the bottom support sleeve 66.

In FIG. 4 the crane unit is seen tipped 90° from its position in FIG. 1 such that a hitch 72 at the top of the standard 42 may be connected to a hitch on the truck 30 with the ground support wheels 22 carrying the unit for transport.

The unit when being used as a tow unit is seen in use in FIGS. 3, 6 and 9. The members 54 have been pivoted 180° from their position in FIG. 1 by temporary removal of the locking pin 40 extending through the sleeve 38 and the cross frame shaft 36. Thus the caster wheels 18 are on the top side and the transport wheels 22 are on the bottom side. A hitch assembly as seen in FIGS. 9 and 10 including top and bottom halves 80 and 82 each including semicylindrical end sections 84 engage the members 54 to lock them together for providing a hitch 86 which can be connected to truck 30 as seen in FIGS. 2 and 3. The half sections 80 and 82 are locked together by a bolt 88 having a hand operable nut 90 on the top side for drawing the sections together against the members 54.

In lifting the front end of a vehicle 24 as seen in FIG. 3, by the tow unit a cable assembly 90 is employed which includes a length of cable 92 having one end 94 connected to vehicle 24 and then extending over a pulley 96 at the top of the standard 42, thence downwardly through the standard and over a pulley 98 at the bottom thereof whereupon the other end 100 of the cable is secured selectively to a chain 102 carried by the boom 44. Accordingly, it is seen that upon operation of the hydraulic jack 48 to move the boom upwardly the cable end 94 engaging the front end of the vehicle 24 will lift the vehicle upwardly and pull it in against a pivotal bumper block 104 on the standard 42. After the vehicle is in the desired raised position the bumper may be locked by chain or the like to the bumper block 104 and the tension in the lifting cable 90 may be released to some extent and function only as a safety connection between the towing unit and the disabled vehicle 24.

Further as seen in FIG. 3, an extendable member 110 is provided pivotally connected between the members 54 between the clevis plates 112 as seen in FIG. 10 and the clevis plates 114 on the standard 42. Adjustment of the length by the handle 114 will pivot the standard 42 towards and away from the vehicles 24 and 30 to place the weight appropriately on the transport wheels 22 and the wheels of the towing vehicle 30 through the tongue 79.

The pivotal adjustment of the bumper block 104 is accomplished by adjusting the adjustment bolt 116 engaging the outer sleeve 62 as seen in FIG. 6. When a vehicle is being towed the bumper block 104 is free to rotate on the standard 42 but is limited in its downward travel by the shoulder 70.

In operation it is seen that the crane and tow unit when being used as a tow unit as viewed in FIGS. 1 and 5, the stabilizer arms 54 are moved to a position under the vehicle 14 such that the boom outer end 46 is over the engine compartment of the vehicle 14. Upon the engine 12 being lifted out of the vehicle 14 by operating of the hydraulic jack 48 the boom 44 may be pivoted to one side or the other while the unit is prevented from tipping by the outrigger arm 60. If it is desired to move the crane unit it may be pivoted 90° to the position of FIG. 4 such that the hitch 72 is connected to the vehicle 30 and the ground transport wheels 22 come into operation relieving the swivel or caster wheels 18.

When it is desired to use the unit 10 as a tow unit it is only necessary to pull the pins 40 and pivot the arms 54 180° to the position of FIG. 9 such that the caster wheels 18 extend upwardly with the transport wheels 22 extending downwardly and supporting the unit. The hitch assembly 79 is quickly attached to the outer ends of the arms 54 for connecting the tongue assembly to a towing vehicle 30 as seen in FIG. 3. The boom 44 is pivoted also 180° to again extend over the arms 54 as seen in FIG. 3. The cable end 94 is then connected to the bumper of a disabled car 24 and through operation of the hydraulic jack 48 the vehicle will be lifted up against the bumper support 104 where it can be locked in place on the standard 42 by chains or the like. A small amount of tension in the cable 90 may be released such that the main load will be carried by the bumper member 104. The adjustment member 110 is placed in position between the members 54 and the standard 42 and the appropriate weight load on the wheels 22 and the towing vehicle 30 is established by pivoting the standard 42 forwardly or rearwardly. The disabled vehicle may now be towed freely and easily by the small pickup truck or the like 30. It is understood that to convert the unit back to a crane it is only necessary to follow the reverse procedure.

The crane and tow unit of FIGS. 11 – 22 is essentially the same as the unit of FIGS. 1 – 10 and is referred generally by the reference numeral 120. Specifically, the basic operation is the same in that the tongue members 122 pivot relative to the upright standard 124 carried on the cross frame member 126. The caster wheels 128 and the transport wheels 130 are disposed 180° apart and pivot with the tongue members 122 such that in the position of FIG. 11 the transport wheels 130 engage the ground and after the tongue members have been pivoted 180° as seen in FIG. 12, the caster wheels 128 engage the ground with the transport wheels 130 being raised thereabove.

The hydraulic jack 132 and the cable arrangement 134A is similar. The stabilizer outrigger arms 134 pivotally connected to the tongue members 122 have jack assemblies 136 at their outer ends. Each of the jack assemblies include a pair of mounting brackets 138 and 140 vertically spaced apart for selective telescopic connection in the outer end of the arms 134. It is seen that when the transport wheels 130 are in engagement with the ground the stabilizer arms 134 are raised substantially above the position therein when the caster wheels 128 engage the ground. Thus, the need for two brackets for mounting the jack assembly 136 to the stabilizer arms 134 arises. This eliminates the screwing endlessly up and down of the jack shaft during its operation. The lower mounting bracket 140 is seen used in FIG. 12 while the raised mounting bracket 138 is used in FIG. 11.

In FIG. 13 the vertical standard 124 which is rotatable through 360° relative to the cross frame member 126 is seen to be limited in its rotation by a dog element 142 pivotally connected between a pair of clevis plates 144 moving in the path of arcuate shaped side located stop members 146 such that the upper shaft portion of the standard 124 will rotate only so far as it is safe and an unstable condition can be avoided. The boom 148 will remain substantially perpendicular to the cross frame 126 when the dog element 142 is in any position between the two stops 146. If it is desired to rotate the standard 124 through full 360° it is only necessary to pivot the dog element 142 outwardly and allow it to pass over the stops.

In FIG. 14 a signalling light unit 148 is seen mounted on the upper end of the standard 124 to shine over a disabled vehicle 150 being towed by a pickup truck 152. The light assembly 148 includes a male element 154 telescopically received in a rectangular and cross section channel member 156. It is seen in FIG. 23 that a light assembly may be detachably removed and a hitch member 158 substituted in its place and held in place by a bolt 160. Thus the unit may be moved about when it is on the caster wheels by the hitch 158 being connected to a vehicle.

The ability of the unit to pivot into a collapsed position as seen in FIGS. 15 and 16, enables it to be used as a pulling device and in particular to be used for straightening the bodies of vehicles. Thus, the boom 162 extends upwardly from the standard 124 which is flat against the tongue members 122. A cable 134A extends from the boom 162 to the fire wall 166 on a vehicle 170 undergoing body repair. The vehicle 170 and the unit are maintained stationary relative to each other by adjacent ends abutting each other. In FIG. 16, it is seen that a separation extension member 172 is provided between adjacent sides of the unit and the vehicle 170. Specifically, the separation member 172 engages the cross frame 126 and the side of the frame of the vehicle 170. The cable 134B is connected to the top of the damaged car 170. It is further seen that the cable 134A is lower than the cable 134B since in FIG. 15 the unit is resting on the caster wheels 128 while in FIG. 16 it is supported by the transport wheels 130.

The capability of the crane and tow unit 120 is seen in FIGS. 17 - 21 to include functioning as a jack. A jack arm 174 is pivotally connected to the cross frame 126 intermediate the tongue members 122. A cable 134C extends over a sheave 176 at the top of the standard 124 and thence to the bottom of the standard over a sheave where a pin is anchored to the boom 148 which is adjustably moved upwardly by the hydraulic power cylinder 132 which in turn will cause the jack arm 174 to be raised. The jack arm 174 includes an inner extension section 178 pivotally connected to the inner end of an outer jack arm section 180 to provide for lateral pivotal movement. A platform assembly 182 is provided on the outer end of the jack arm 180 and includes a plate 184 having upwardly flaring sides 186 and leveling bolts 188 extending upwardly through the plate to assure that the item being supported is stable on the platform. These may be manually adjusted to give uniform support. A detachable end wall 190 is provided to extend across the plate 184 and includes downwardly extending pins 192 which are received in openings 194 in the plate 184. The plate 184 is rotatably connected to a lower support plate 196 by a pin 198. A downwardly extending channel 200 from the support plate 196 is embraced by an upwardly facing channel 202 pivotally connected thereto by a bolt 204. The angular adjustment of the platform 182 is accomplished through a hand setscrew 206 engageable with the member 200 for pivotal action about the pin 204. A downwardly extending bracket 208 embraces the jack arm section 180 and is pivotally connected thereto by a pin 210. The space 212 allows for this pivotal action. In FIGS. 20 and 21 it is seen that the jack arm 174 includes at its outer end a bumper and frame jack assembly 214 which includes a laterally extending square and cross sectional channel member 216 pivotally connected to the jack arm section 180 by a pair of downwardly extending plates 218. A pair of lifting brackets 220 are provided on opposite ends of the member 216 and include openings 222 vertically spaced and extending at right angles to each other which are adapted to receive the end of the member 216 with either end up to give the desired spacing since with one end up the bracket extends higher than with the other end up. Outwardly flaring cradle elements 224 are provided on opposite ends of the bracket 220 to hold in place a frame member or the like being lifted. These elements, if desired, may be rotatably connected to the main body section of the bracket 220.

At times it may be desirable to use the unit 120 for raising or lowering items long distances such as into a well or the like. The unit as seen in FIG. 22 accommodates this job by including a winch 226 on the boom 148 such that the winch cable 228 extends outwardly over a sheave 230 on the outer end and downwardly. Thus it is seen that the lift cable 134D is used to move a load off of a truck or the like where short lifting distances are involved and then when the item is moved to the lower position where it is ready to be lowered the winch cable 228 is connected to it and the lifting cable 134D is disconnected. The winch 226 is then operated to lower the load to the desired elevation. It is seen that the lifting action of the lifting cable 134D is limited by the angular movement of the boom 148 resulting from extension and contraction of the hydraulic cylinder 132.

In some very heavy load situations an extra heavy duty piece of equipment may be required which may involve making the tongue members and upright standard integral. Thus in FIGS. 23 - 25 the tongue members 122A are integrally connected with the upright standard 124A. The transport wheels 130 are mounted at one end of wheel arms 236 connected to a transversely extending shaft 238 selectively locked to the cross frame 126A by a detachable pair of pins 240. In this embodiment none of the load is transmitted through the pins 240 since it is transmitted directly to the shaft 238 through the cross frame 126A. In the previous embodiments the load was transmitted through the pin locking the tongue members to the upright member. It is further seen that the caster wheels 128A are mounted on the lower side of the cross frame on the bottom of end frame member 241. Accordingly, in FIGS. 23 and 24, it is seen that a detachable lever 242 is received in an opening 244 in the wheel mounting arm 236 to cause 180° rotation of the wheel arm between the downward ground engaging position of FIG. 23 to the upward disengaged position of FIG. 24 where the caster wheels 128A engage the ground. In FIG. 25 it is seen that the arm 236A includes a caster wheel 128B on the opposite end from the transport wheel 130 and thus upon rotation of the arm 236A 1180° a caster wheel will be pivoted into ground engagement position with the transport wheel 130 being pivoted out of engagement with the ground. This arrangement has the advantage over that of FIGS. 23 and 24 in that the caster wheel 128B is positioned upwardly and out of position for any possible accidental contact with the ground. In both of these embodiments 180° rotation of the wheel arm is required and the transversely extending axle shaft 238A turns as a unit with the wheel arms relative to the cross frame 126A and the integral standard 124A and tongue members 122A.

Thus it is seen that in operation practically any job can be accomplished which would normally require separate pieces of highly expensive equipment but with the crane and tow unit of this invention all of these things can be accomplised with a single piece of equipment and the accessories described.

I claim:

1. A crane and two unit comprising,
a cross frame having an upstanding standard and a pair of wheels at opposite ends of said cross frame,
a pair of tongue members connected to opposite ends of said cross frame and adapted to be interconnected at their outer free ends,
a boom pivotally extending from said standard,
a lift cable connected to said boom,
a jack arm pivotally connected to said cross frame between said tongue members for vertical pivotal movement,
said boom extends in the opposite direction from said jack arm and said lift cable extends from said jack arm up over the top of said standard, down to the adjacent cross frame and then to said boom where it is anchored, and
power means extends between said boom and said standard for pivoting said boom upwardly relative to said standard and thereby pivoting said jack arm upwardly.

2. The structure of claim 1 wherein said jack arm includes at its outer end a rotatable platform pivotally connected to said jack arm for pivotal movement in two directions said first direction being about an axis extending laterally of the longitudinal axis of said jack arm and said second direction being about an axis extending parallel to said jack arm, and means is provided for pivotal action about said second axis.

3. The structure of claim 2 wherein a plurality of vertically adjustable leveling elements extend upwardly from said platform in spaced apart relationship.

4. The structure of claim 1 wherein a detachable cross arm is provided on said jack arm, said cross arm includes a pair of lifting brackets slidably and detachably secured thereto and said lifting brackets include a plurality of openings therethrough to receive said cross arm, said openings are spaced between opposite ends of said brackets, said brackets are adapted to be positioned on said cross arm with either end facing upwardly to support a load to be raised.

5. The structure of claim 1 wherein a second set of wheels is operatively connected to said tongue members and said tongue members are pivotally connected to said cross frame such that when they are pivoted 180° to extend in the opposite direction said second set of wheels is moved into ground engagement and said first set is moved out of engagement with the ground.

6. The structure of claim 1 wherein said cross frame and said tongue members are rigidly interconnected for limiting pivotal movement about the axis of said cross frame, and a second set of wheels associated with said cross frame to alternately support said unit independently of said first set of wheels, said first set of wheels being carried on mounting arms for pivotal movement between raised and lowered positions with said second set of wheels engaging the ground in said raised position.

* * * * *